(12) United States Patent
Daikoku et al.

(10) Patent No.: US 12,222,207 B2
(45) Date of Patent: Feb. 11, 2025

(54) MAP MATCHING APPARATUS AND MAP MATCHING METHOD

(71) Applicant: Mitsubishi Electric Corporation, Tokyo (JP)

(72) Inventors: Kentaro Daikoku, Tokyo (JP); Yuko Ohta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 278 days.

(21) Appl. No.: 17/796,417

(22) PCT Filed: Mar. 24, 2020

(86) PCT No.: PCT/JP2020/013078
§ 371 (c)(1),
(2) Date: Jul. 29, 2022

(87) PCT Pub. No.: WO2021/192054
PCT Pub. Date: Sep. 30, 2021

(65) Prior Publication Data
US 2023/0049449 A1 Feb. 16, 2023

(51) Int. Cl.
*G01C 21/32* (2006.01)
*G01C 21/00* (2006.01)

(52) U.S. Cl.
CPC ......... *G01C 21/32* (2013.01); *G01C 21/3815* (2020.08); *G01C 21/3841* (2020.08); *G01C 21/3878* (2020.08)

(58) Field of Classification Search
CPC .............. G01C 21/32; G01C 21/3815; G01C 21/3841; G01C 21/3878
See application file for complete search history.

(56) References Cited

U.S. PATENT DOCUMENTS 9,322,659 B2 * 4/2016 Ikeuchi .............. G01C 21/3878
2011/0098912 A1  4/2011 Baselau et al.
(Continued)

FOREIGN PATENT DOCUMENTS

JP  2004-125537 A  4/2004
JP     5587306 B2  9/2014
(Continued)

OTHER PUBLICATIONS

International Search Report, issued in PCT/JP2020/013078, PCT/ISA/210, dated Jun. 16, 2020.
(Continued)

*Primary Examiner* — Hunter B Lonsberry
*Assistant Examiner* — Harrison Heflin
(74) *Attorney, Agent, or Firm* — Birch, Stewart, Kolasch & Birch, LLP

(57) ABSTRACT

According to the present disclosure, a map matching apparatus includes a map information acquisition unit configured to acquire map information expressed by a plurality of links, a movement information acquisition unit configured to acquire movement information of a moving body on a predetermined route, and a matching unit configured to specify a link string, which is a string of the links corresponding to the route, based on the map information and the movement information, in which the matching unit is configured to generate a physical network, which is a road network, based on the connection relationship and the map information, generate a hierarchical logical network in which the physical network is duplicated in a plurality of layers and configured in a hierarchical manner, and specify the link string indicating a minimized cost in the hierarchical logical network.

12 Claims, 15 Drawing Sheets

(56) References Cited

U.S. PATENT DOCUMENTS

| | | | |
|---|---|---|---|
| 2011/0118971 A1 | 5/2011 | Petzold et al. | |
| 2014/0278103 A1* | 9/2014 | Daikoku | G01C 21/3469 |
| | | | 701/533 |
| 2017/0310574 A1 | 10/2017 | Wolting | |
| 2020/0173802 A1* | 6/2020 | Thunga Gopal | G01C 21/3492 |
| 2020/0364469 A1* | 11/2020 | Fowe | G06F 16/29 |
| 2021/0319690 A1* | 10/2021 | Ogawa | G08G 1/0125 |

FOREIGN PATENT DOCUMENTS

| | | |
|---|---|---|
| JP | 2017-529796 A | 10/2017 |
| JP | 2019-184493 A | 10/2019 |
| WO | WO 2015/107856 A1 | 7/2015 |
| WO | WO 2016/048143 A1 | 3/2016 |

OTHER PUBLICATIONS

Tom Tom International B.V. "OpenLR White Paper", 1.5 revision 2, 2009-2012, total 156 pages.

Written Opinion of the International Searching Authority, issued in PCT/JP2020/013078, PCT/ISA/237, dated Jun. 16, 2020.

German Office Action for German Application No. 11 2020 006 473.5, dated Jun. 2, 2023, with English translation.

* cited by examiner

F I G. 1 4
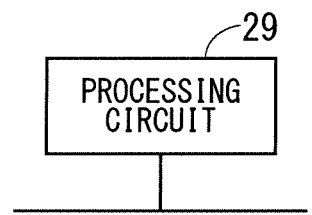

F I G. 1 5
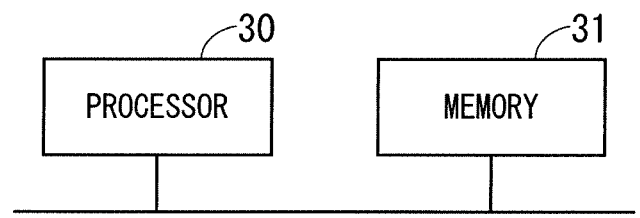

MAP MATCHING APPARATUS AND MAP MATCHING METHOD

TECHNICAL FIELD

The present disclosure relates to a map matching apparatus and a map matching method for expressing a movement route of a moving body before conversion on a map after conversion between different maps.

BACKGROUND ART

In an autonomous driving system, a high-definition locator provides a vehicle with lane-level high-precision shape information (latitude/longitude and curvature, etc.) included in a high-precision map, road attributes (road types, etc.), link attributes (acceleration/deceleration lanes, ramp lanes, and branch lanes, etc.), regulation speeds, and lane-changeability information for route and its surroundings expressed at the road-level along which the vehicle should or is supposed to travel, along with highly accurate location information of the vehicle. An Electronic Control Unit (ECU) provided in the vehicle calculates vehicle control information for controlling the traveling of the vehicle based on information provided by the high-definition locator and surrounding information detected using a sensor provided in the vehicle. The high-definition locator acquires the route expressed at the road-level along which the vehicle should or is supposed to travel from an In-Vehicle Infotainment (IVI) provided in the vehicle. Examples of IVIs include navigation systems.

It is generally assumed that the map supplier of a map used by the IVI and the map supplier of a map used by the high-precision map used by the high-definition locator are different, and even if it is the same map supplier, both maps are not linked in link units because the maintenance standards and digitization methods for each map are different. Therefore, in the high-definition locator, the process, which converts the route based on the map used in the IVI in order to express it on the high-precision map that the high-definition locator holds, is required. Information that can be commonly used in both maps at the time of conversion includes, for example, latitude/longitude information and some attribute information. Some attribute information includes, for example, infrastructure link numbers (Vehicle Information and Communication System (registered trademark) (VICS) link numbers and Traffic Message Channel (TMC) link numbers, etc.), road types, link types, link azimuths, branch directions, number of lanes, road widths, road names, national road numbers, and prefecture numbers, and the like. However, even for such information that can be used in common, it is expected that errors such as position and differences in types will be included between the two maps; therefore, it is required to solve the problem of "searching for the route on the high-precision map closest to the input route" instead of "identifying the route on the high-precision map that exactly matches the input route".

The above problem "searching for the route on the high-precision map closest to the input route" can be regarded as an offline map matching problem (hereinafter, simply referred to as "offline map matching") if it is regarded as a more generalized problem. Here, offline map matching refers to an offline version (post-processing version) of so-called "map matching".

Map matching generally refers to a process of specifying a traveling link on a map based on information such as latitude/longitude calculated by a locator by satellite positioning or inertial navigation while a moving body is traveling. Such a process requires real-time performance; therefore, it is typical for a locator to perform a process to specify a driving link that is considered the most probable at that moment, based on information such as latitude/longitude that are sequentially input.

On the other hand, in the offline map matching, information such as a plurality of points of latitude and longitude included in the entire route from the start of travel to end of travel is collectively input to the locator. In the offline map matching, the process of specifying a driving like that is considered the most probable based on the consistency of the entire route and the continuity of the driving link string is performed, so matching skipping and mismatching that occur in general map matching are suppressed. Therefore, it is expected that the offline map matching will make it possible, in principle, to specify a driving link that is considered the most probable more accurately than general map matching.

Conventionally, there is OpenLR etc. as a technique aimed at converting different map information. OpenLR is disclosed in, for example, Patent Document 1 and Non-Patent Document 1.

PRIOR ART DOCUMENTS

Patent Documents

[Patent Document 1] Japanese Patent No. 5587306 Non-Patent Documents
[Non-Patent Document 1] TomTom International B.V. "OpenLR White Paper", 1.5 revision 2

SUMMARY

Problem to be Solved by the Invention

In OpenLR, an encoding side encodes data using a map that the encoding side possesses so that a decoding side is expected to decode correctly. On the decoding side, the received data is decoded using a map possessed by the decoding side. Specifically, in an encoding process, a location reference point (LRP) at which the route is correctly decoded is specified, and the location reference point and attribute information related to the location reference point are transmitted to the decoding side.

However, in the decoding process, OpenLR is an algorithm that specifies the link that best matches the location reference point and its attribute information in the input route information among the links connected to the location reference point, and searches for the shortest route between the location reference points with an absolute condition of passing through the link. Therefore, there is a problem that, if there is an error in specifying the link that best matches the location reference point and its attribute information, the correct route cannot be shown on the converted map. That is, it is understood that this is a harm caused by specifying a via link using the local evaluation function in the route, instead of evaluating the degree of matching of the input route information by considering the entire route. This is a fundamental problem in the OpenLR algorithm in improving the conversion rate of route information between different maps.

In applications related to autonomous driving, failure to convert route information between different maps is a serious problem that can lead to malfunction of autonomous driving. In other words, based on the current technical restrictions, autonomous driving, that is supposed to operate under the geographically and environmentally restricted conditions of the current situation, will be allowed to operate under conditions other than these restricted conditions, causing a possible serious malfunction. From that point of view, executing route conversion as accurately as possible is an essential condition for realizing a safe and reliable autonomous driving system.

In addition, in OpenLR, the encoding process specified by the standard is required to perform on the encoding side. Accordingly, there is a problem that, when the route information is transmitted to the decoding side in a format such as Advanced Driver Assistance Systems Interface Specification (ADASIS)-V2, which is a standard forward route output format, the decoding process cannot be applied to the received route information as it is, on the decoding side.

As described above, conventionally, there has been a problem that the route before conversion cannot be accurately matched on the map after conversion between different maps, and there has been room for improvement.

The present disclosure has been made to solve such a problem, and an object of the present disclosure is to provide a map matching apparatus and a map matching method capable of accurately matching a route before conversion on a map after conversion between different maps.

Means to Solve the Problem

According to the present disclosure, the map matching apparatus includes a map information acquisition unit configured to acquire map information including link endpoint coordinates, which are coordinates of endpoints of a plurality of links, and a connection relationship of each of the links, a movement information acquisition unit configured to acquire movement information of a moving body on a predetermined route, and a matching unit configured to specify a link string, which is a string of the links corresponding to the route, based on the map information which the map information acquisition unit has acquired and the movement information which the movement information acquisition unit has acquired, in which the matching unit is configured to generate a physical network, which is a road network, based on the connection relationship and the map information, generate a hierarchical logical network in which the physical network is duplicated in a plurality of layers and configured in a hierarchical manner, and specify the link string indicating a minimized cost in the hierarchical logical network.

Effects of the Invention

According to the present disclosure, the matching unit is configured to generate a physical network, which is a road network, based on a connection relationship and movement information, generate a hierarchical logical network which is configured by duplicating the physical network a plurality of times and making them into hierarchy, and specify the link string indicating the minimized cost in the hierarchical logical network; therefore, the map matching apparatus is capable of accurately matching a route before conversion on a map after conversion between different maps.

The objects, features, aspects, and advantages of the present disclosure will become more apparent from the following detailed description and the accompanying drawings.

BRIEF DESCRIPTION OF DRAWINGS

FIG. 14 is a block diagram showing an example of a hardware configuration of the map matching apparatus according to the embodiments.

FIG. 15 is a block diagram showing an example of a hardware configuration of the map matching apparatus according to the embodiments.

DESCRIPTION OF EMBODIMENT(S)

First Embodiment

<Configuration>

Figure 1:
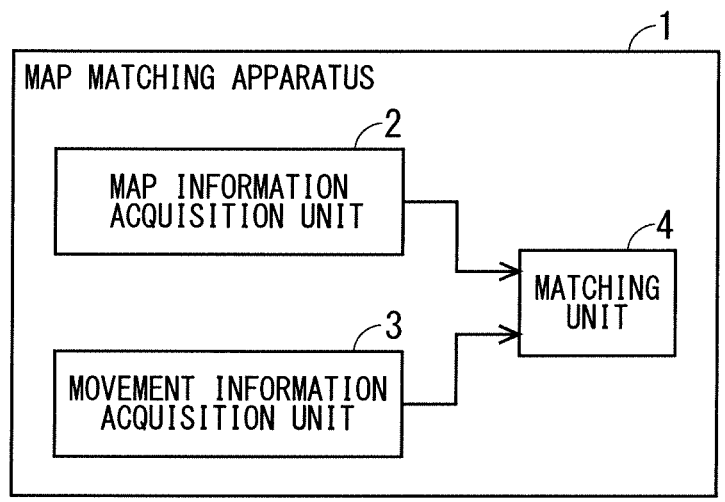
FIG. 1 is a block diagram showing an example of a configuration of a map matching apparatus according to a first embodiment.

FIG. 1 is a block diagram showing an example of a configuration of a map matching apparatus 1 according to a first embodiment. The map matching apparatus 1 performs offline map matching described above. As shown in FIG. 1, the map matching apparatus 1 includes a map information acquisition unit 2, a movement information acquisition unit 3, and a matching unit 4.

The map information acquisition unit 2 acquires map information including link endpoint coordinates, which are the coordinates of the endpoints of each link, and a connection relationship of each link. The movement information acquisition unit 3 acquires movement information of a moving body on a predetermined route. In the following, the moving body will be described as being a vehicle.

The matching unit 4 identifies a link string, which is a string of links corresponding to the route, based on the map information which the map information acquisition unit 2 has acquired and the movement information which the movement information acquisition unit 3 has acquired.

Specifically, the matching unit 4 generates a physical network, which is a road network, based on the movement information and the connection relationship among the links included in the map information, generates a hierarchical logical network in which the physical network is duplicated a plurality of times and superimposes the layers into hierarchy, and specifies a link string indicating the minimized cost in the hierarchical logical network.

Figure 2:
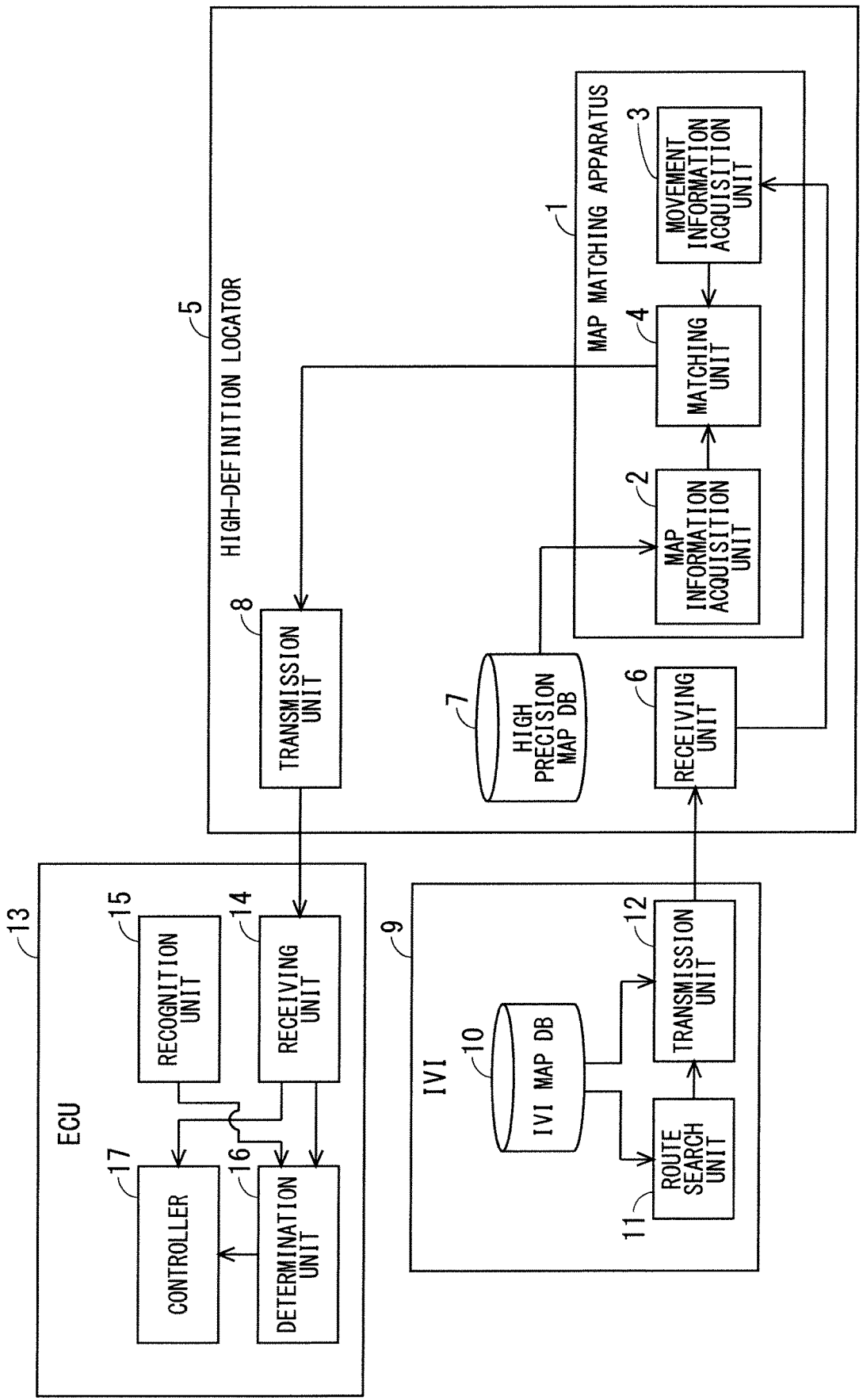
FIG. 2 is a block diagram showing an application example of the map matching apparatus according to the first embodiment.

FIG. 2 is a block diagram showing an application example of the map matching apparatus 1 shown in FIG. 1, and shows an example of the configuration of an autonomous driving system. In the autonomous driving system shown in FIG. 2, the map matching apparatus 1 specifies the route of the moving body acquired from an IVI 9 on the high-precision map and transmits the route to an ECU 13. The ECU 13 controls to autonomously drive the moving body in accordance with to the route specified on the high-precision map. Hereinafter, each component of the autonomous driving system will be described. The autonomous driving system is a function included in Advanced Driver Assistance System (ADAS).

A high-definition locator 5 includes the map matching apparatus 1, a receiving unit 6, a high-precision map database (DB) 7, and a transmission unit 8.

The map matching apparatus 1 includes the map information acquisition unit 2, the movement information acquisition unit 3, and the matching unit 4. The functions of the map information acquisition unit 2, the movement information acquisition unit 3, and the matching unit 4 are as described above.

The map information acquisition unit 2 acquires map information, which is a high-precision map, from the high-precision map database (DB) 7. Specifically, the map information acquisition unit 2 is an Application Programming Interface (API) group for acquiring necessary information from the high-precision map DB 7.

The movement information acquisition unit 3 acquires the movement information which the receiving unit 6 has received from the IVI 9. The movement information includes a coordinate point string of positions on the route on which the moving body is to travel. Further, the movement information may include attribute information regarding the route. Examples of the route on which the moving body is to travel include a route of guide in progress or a route expected to be traveled in the future if it is not a route of guide in progress.

The matching unit 4 identifies a link string, which is a string of links corresponding to the route, based on the map information which the map information acquisition unit 2 has acquired and the movement information which the movement information acquisition unit 3 has acquired. If the map information corresponding to a part of a section of the route included in the movement information is not stored in the high-precision map DB7, the matching unit 4 does not specify the link string corresponding to the part of the section.

The receiving unit 6 receives the movement information on the route on which the moving body is to travel from the IVIS. The high-precision map DB7 stores the high-precision map as a database. Specifically, the high-precision map DB7 stores lane-level detailed shape information, information indicating the connection relationship between lanes, and lane-changeability information.

The transmission unit 8 adds road information (position, shape, attributes, etc.) and position information of the moving body and the like necessary for control by the ECU 13 to the link string the matching unit 4 has specified and transmits the link string to the ECU 13. As the position information of the moving body, the position information measured by a high-precision positioning unit (not shown) provided in the high-definition locator 5 may be adoptable, and the high-definition locator 5 may predict the position of the moving body based on the movement information which the receiving unit 6 has received.

The IVI 9 includes an IVI map database (DB) 10, a route search unit 11, and a transmission unit 12. The IVI 9 is, for example, a navigation system.

The IVI map DB 10 stores a regular map used in the navigation system as a database. The regular map does not include lane-level detailed shapes, only road-level schematic shapes. The schematic shape is less accurate than the high-precision map. Typically, it is said that a road-level schematic shape may contain an error of about 10 m. In addition, the latitude/longitude at branch points and the like in the regular map may differ from those in the high-precision map due to differences in maintenance specifications between the regular map and the high-precision map. Furthermore, the regular map does not always include newly opened roads in synchronization with high-precision maps; therefore, the assumption that differences are found in the contents of both maps lies.

The route search unit 11 determines the route to the destination at the road level as the shortest route issue based on the regular map stored in the IVI map DB 10. That is, the route search unit 11 determines the route on which the moving body will travel in the future.

The transmission unit 12 transmits the movement information of the moving body in the route the route search unit 11 has searched to the high-definition locator 5. If the destination is not set, the transmission unit 12 transmits the route predicted that the moving body will travel in the future to the high-definition locator 5. The route search unit 11 may perform such a route prediction. Note that ADASIS-V2 or the like, which is a commonly-adopted standard, may be adopted for communication between the transmission unit 12 and the receiving unit 6 of the high-definition locator 5.

The ECU 13 includes a receiving unit 14, a recognition unit 15, a determination unit 16, and a controller 17. The ECU 13 controls the autonomous operation of the moving body.

The receiving unit 14 receives information such as a link string specified on the high-precision map from the high-definition locator 5. The recognition unit 15 recognizes the state of the moving body and the situation around the moving body and the like required for automatic driving based on the information received from the sensor provided on the moving body. The determination unit 16 determines how the movement of the moving body should be controlled based on the recognition result by the recognition unit 15 and the information which the receiving unit 14 has received. The controller 17 controls the movement of the moving body based on the determination result by the determination unit 16 and the information which the reception unit 14 has received.

<Operation>

Figure 3:
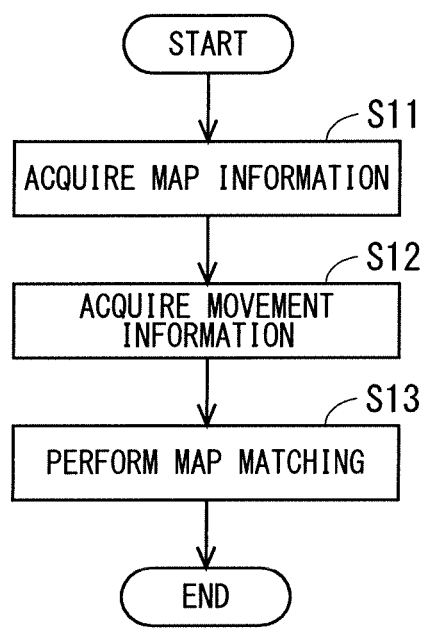
FIG. 3 is a flowchart showing an operation example of the map matching apparatus according to the first embodiment.

FIG. 3 is a flowchart showing an operation example of the map matching apparatus 1.

In Step S11, the map information acquisition unit 2 acquires the map information of high-precision from the high-precision map database (DB) 7. In Step S12, the movement information acquisition unit 3 acquires the movement information which the receiving unit 6 has received from the IVI 9. In Step S13, the matching unit 4 performs a map matching process.

Figure 4:
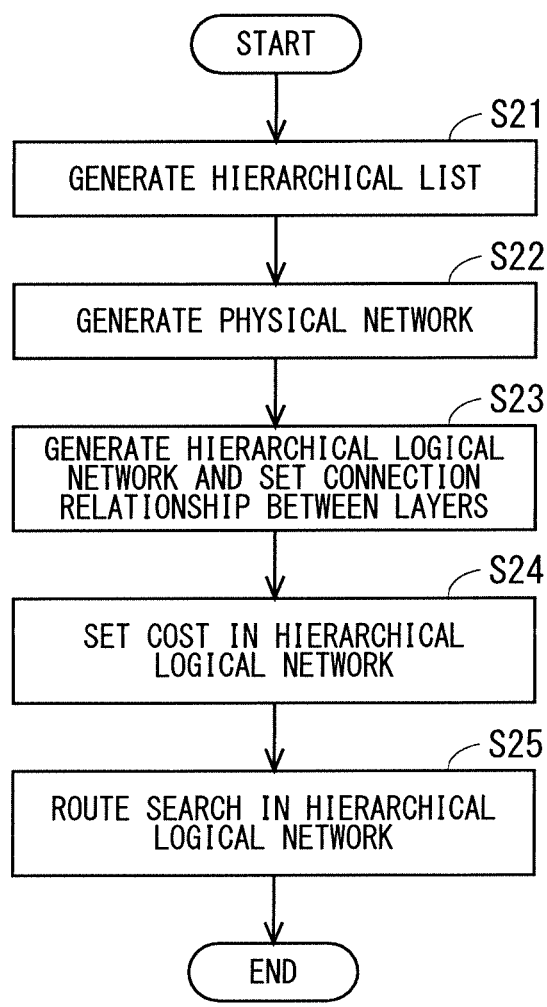
FIG. 4 is a flowchart showing an operation example of the map matching apparatus according to the first embodiment.

FIG. 4 is a flowchart showing the details of the map matching process in Step S13 of FIG. 3.

In Step S21, the matching unit 4 generates a hierarchical list based on the coordinate point strings and the attribute information included in the movement information which the movement information acquisition unit 3 has acquired. Hereinafter, a case where the movement information acquisition unit 3 acquires the movement information shown in FIG. 5 will be described.

Figure 5:
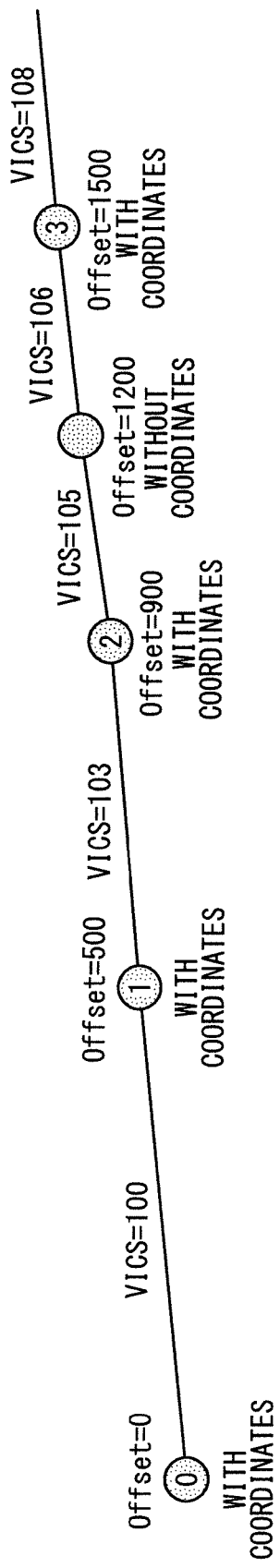
FIG. 5 is a diagram showing an example of movement information according to the first embodiment.

In FIG. 5, "Points 0, 1, 2, and 3" indicate a string of coordinate points at a plurality of positions on the route on which the moving body is to travel. Note, "Points 0, 1, 2, are 3" are also collectively referred to as "waypoints". "VICS=100, 103, 105, 106, 108" represents the VICS number, and indicates the link attribute of the link connected to each Point 0, 1, 2, and 3. "Offset=0, 500, 900, 1200, 1500" represents the distance from Point 0. Further, unnumbered Point existing between Points 2 and 3 represents a point where the link attributes change, and is also referred to as an "attribute change point".

Figure 6:
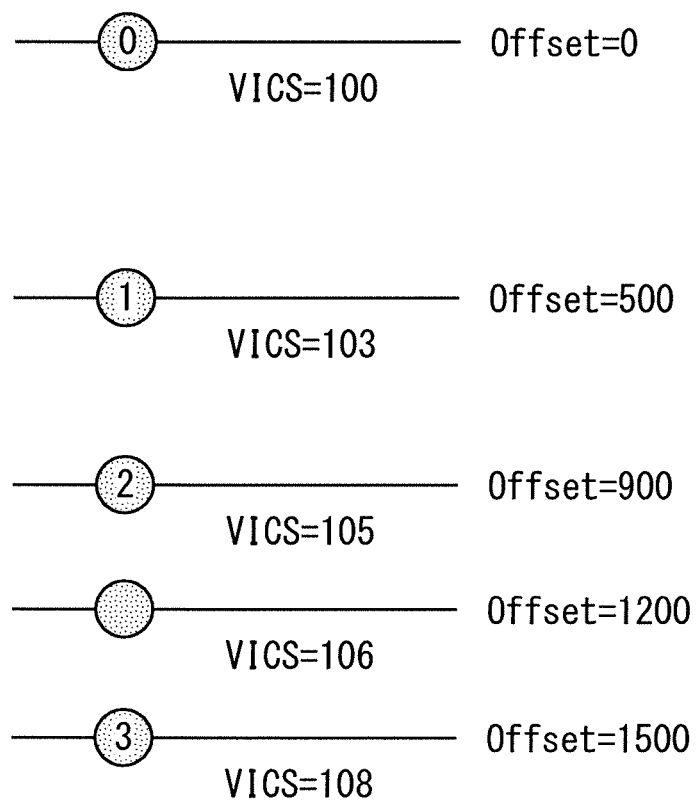
FIG. 6 is a diagram showing an example of a hierarchical list according to the first embodiment.

The matching unit 4 generates a hierarchical list as shown in FIG. 6 based on the movement information shown in FIG. 5. The hierarchical list shows a hierarchy in which movement information is arranged in the order of Offset and separated by the waypoints and the attribute change point.

In Step S22, the matching unit 4 generates a physical network based on the movement information and the high-precision map. The physical network is a road network on the high-precision map, which is a target when searching for a route on which the moving body is to travel on the high-precision map. The links and nodes consisting the physical network are referred to as "physical links" and "physical nodes," respectively. The physical network has information about the physical links and the physical nodes, such as a link shape, the link attribute, the link number, and the parameters necessary for calculating the cost described later. The term "physical" is used here to clarify the contrast with the non-existent virtual "logical network", "logical link", and "logical node" described later.

Specifically, the matching unit 4 searches for a physical link existing near a waypoint or an attribute change point. Then, the matching unit 4 expands the physical link from the searched physical link to the next waypoint or the attribute change point. The matching unit 4 generates a physical network as shown in FIG. 7 by performing such a procedure for all waypoints and the attribute change point.

Figure 7:
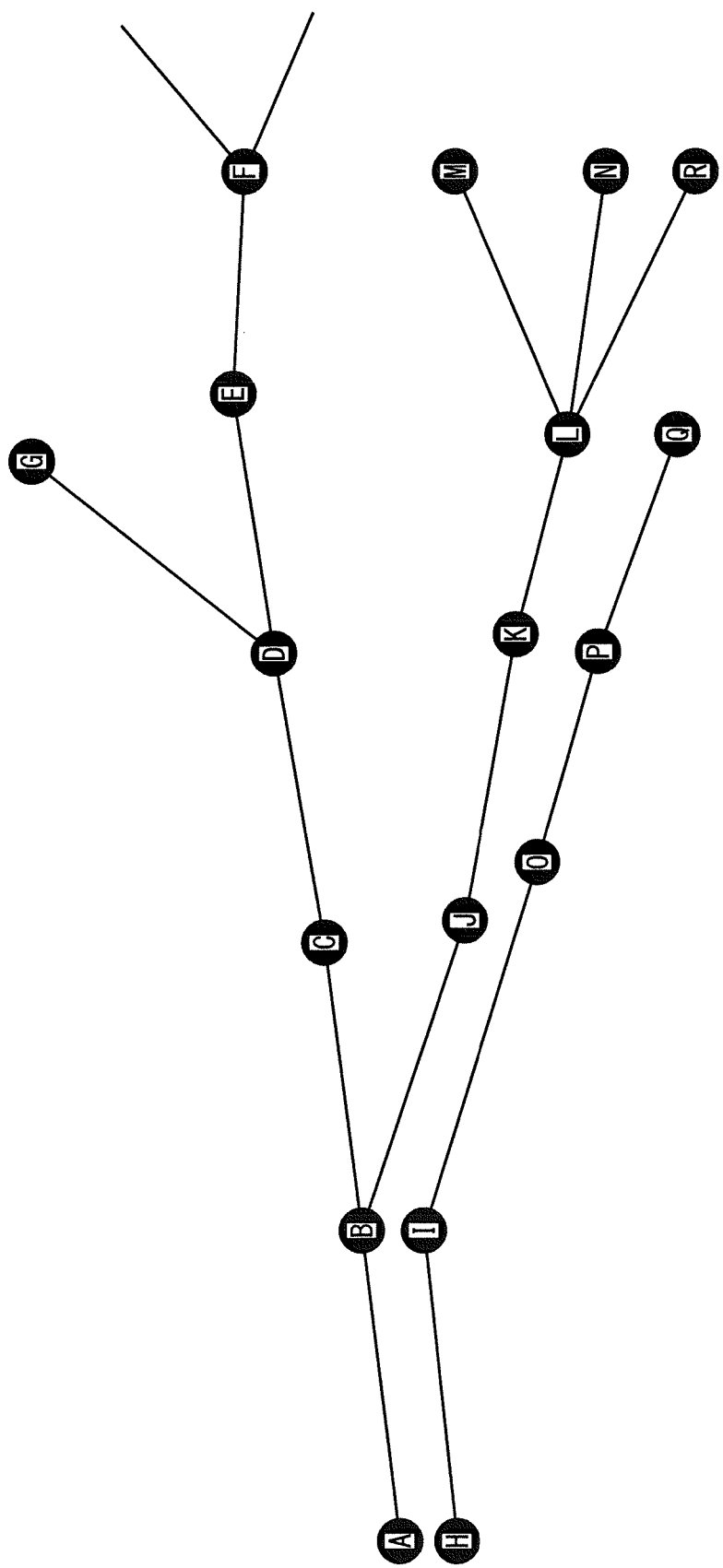
FIG. 7 is a diagram showing an example of a physical network according to the first embodiment.
Figure 8:
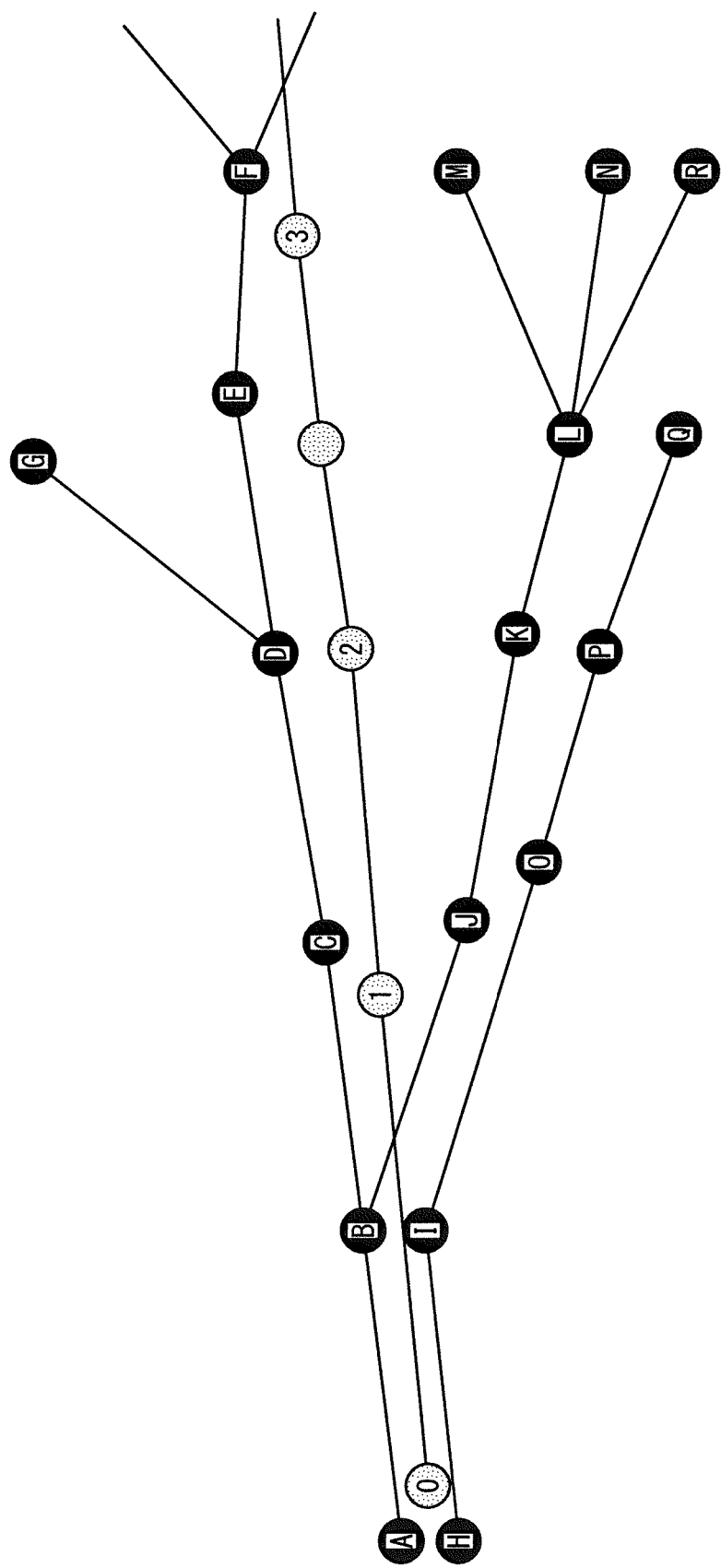
FIG. 8 is a diagram showing an example of the movement information and the physical network according to the first embodiment.

FIG. 8 is a diagram showing the movement information shown in FIG. 5 and the physical network shown in FIG. 7 together. The matching unit 4 searches for the physical link AB and the physical link HI existing near Point 0 which is a waypoint. Here, the "physical link AB" indicates that the link connects the physical node A and the physical node B, and the same applies to other physical links.

Then, the matching unit 4 expands each of the physical link AB and the physical link HI up to the next waypoint, Point 1. In the example of FIG. 8, the physical link BC and the physical link BJ are expanded from the physical link AB, and the physical link IO is expanded from the physical link HI. The matching unit 4 generates a physical network by performing such a procedure for all waypoints and the attribute change point.

In Step S23, the matching unit 4 generates a hierarchical logical network and sets the connection relationship between the layers. Specifically, the matching unit 4 duplicates the physical network generated in Step S22 by the same number as the number of layers shown in the hierarchical list generated in Step S21. In order to clarify the contrast with the above-mentioned "physical network", which is the network configured by duplicating the physical network a plurality of times and making them into hierarchy, is referred to as a "hierarchical logical network" (see FIG. 9 described later).

Here, the links and nodes constituting the hierarchical logical network are referred to as "logical link" and "logical node", respectively, in order to clarify the contrast with the above-mentioned "physical link" and "physical node". The hierarchical logical network is made of duplications of the physical network; therefore, the physical link and the logical link having the same link attribute correspond to each other, and the physical node and the logical node having the same position coordinates correspond to each other. In the hierarchical logical network, the logical node of the layer k (layers 0, 1, . . . From the starting point; the same applies hereinafter) and the physical node X represent a "state where the position of the physical moving body is the position of the physical node X, and the passing state of each waypoint has passed up to the waypoint k and has not passed after the waypoint k+1". Therefore, the movement of the logical node which is the physical node X and from the layer k to the layer k+1 corresponds to "determining that the waypoint k has been passed". Here, from the viewpoint of the reproducibility of the route based on the movement history of the moving body, if the position of the physical node X is far away from the waypoint k, it is determined that the reproducibility of the route is low, and a large penalty is imposed on such a route. On the other hand, if the position of the physical node X is close to the waypoint k, it is determined that the reproducibility of the route is high, and a small penalty is imposed on such a route.

A start link in the hierarchical logical network is the logical link within a layer corresponding to the first waypoint and closest to the first waypoint. An end link in the hierarchical logical network is the logical link within a layer corresponding to the last waypoint and closest to the last waypoint. Specifically, the matching unit 4 determines that the logical link existing within a predetermined radius centered on the first waypoint is the start link, and the logical link existing within a predetermined radius centered on the last waypoint is the end link. The start link and the end link may include, in addition to the logical link existing within the predetermined radius, the logical links connected before and after thereof distanced by the predetermined distance from the logical link based on the connection relationship of the links.

In the above, although the case where the number of layers in the hierarchical logical network corresponds to the number of division sections obtained by dividing the route searched by the route search unit 11 of IVI 9 by the waypoints and the attribute change point has been described, this is not limited thereto. For example, the number of layers in the hierarchical logical network may correspond to the number of divided sections obtained by dividing the route searched by the route search unit 11 of IVI 9 by the road attribute included in the movement information. Examples of road attributes include a road type, a link type, the number of lanes, a road width, a speed limit, presence/absence of toll, a link number, a road name, a national road number, a prefectural road number, and the like. As described above, when the switching of the layers corresponds to the attribute change point, the logical node of the layer k and the physical link Y in the hierarchical logical network represents the "the state where the position of the physical moving body is the position of the physical link Y, and the road attribute in the movement history of the moving body stays within the kth section". Therefore, it is determined that the movement of the logical node which is the physical link Y and from the layer k to the layer k+1 corresponds to "determining that the kth and k+1st attribute change points in the movement history of the moving body have been passed". Here, from the viewpoint of the reproducibility of the route based on the movement history of the moving body, if the link attribute of the physical link Y is not consistent with the kth road attribute of the movement history of the moving body (when they are far away from each other), it is determined that the reproducibility of the route is low, and a large penalty is imposed on such a route. On the other hand, if the link attribute of the physical link Y is consistent with the kth road attribute of the movement history of the moving body (when they are close to each other), it is determined that the reproducibility of the route is high, and a small penalty is imposed on such a route. It should be noted that the layers in the hierarchical logical network may be associated with both each waypoint and each road attribute of the movement history of the moving body.

Next, the matching unit 4 sets an inter-layer link at appropriate positions between the layers of the hierarchical logical network. Specifically, the matching unit 4 sets the logical link connecting the same logical nodes in each adjacent layer as an inter-layer link.

Figure 9:
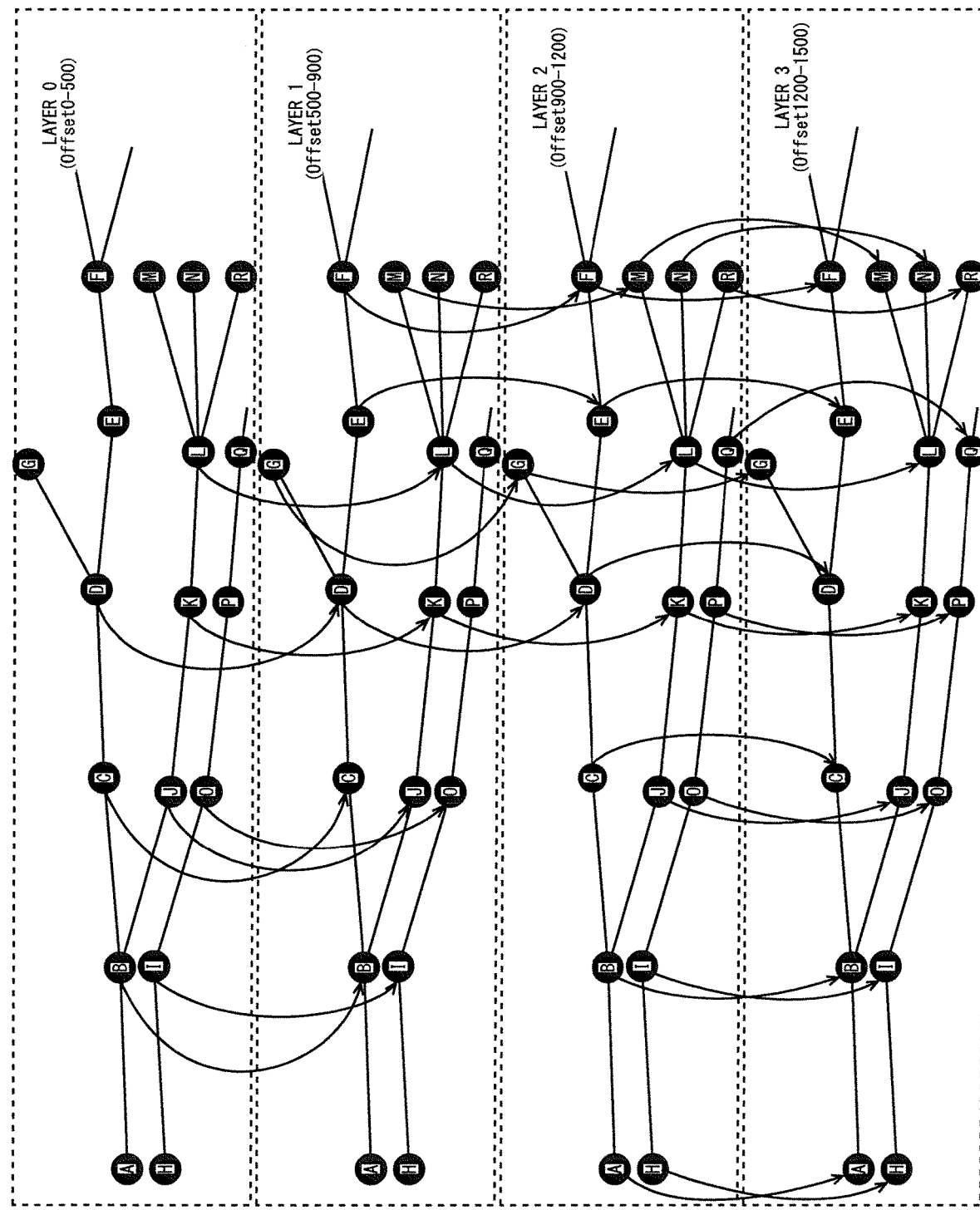
FIG. 9 is a diagram showing an example of a connection relationship between each layer in a hierarchical logical network according to the first embodiment.

FIG. 9 is a diagram showing an example of the connection relationship between each layer in the hierarchical logical network. In FIG. 9, the logical link connecting the same logical nodes in each layer is an inter-layer link. The boundary of each layer in the hierarchical logical network corresponds to a waypoint or an attribute change point. In the example of FIG. 9, the boundary between Layer 0 and Layer 1 corresponds to Waypoint 1, and the boundary between Layer 2 and Layer 3 corresponds to the attribute change point. Inter-layer links are set according to the concepts shown in (A) and (B) below.

(A) When the boundary between layers corresponds to a waypoint, the matching unit 4 sets only the logical nodes that can be regarded as having a correspondence relationship by satisfying the conditions such as being within a predetermined distance from the waypoint as inter-layer links.

(B) When the boundary between layers corresponds to the attribute change point, the matching unit 4 unconditionally sets the inter-layer links for all the logical nodes.

In Step S24, the matching unit 4 sets the cost in the hierarchical logical network. Specifically, the matching unit 4 sets the cost for the inter-layer link set in Step S23 and the logical link in each layer (hereinafter, also referred to as "intra-layer link"). The cost setting value is designed to be small when a route that is consistent with the movement history of the moving body or a route that is close to the moving history of the moving body is selected. Further, the cost setting value of is designed to be large when a route that is not consistent with the movement history of the moving body or a route that is far from the moving history of the moving body is selected. In the first embodiment, the above-mentioned "consistent with" or "not consistent with", or "close to" or "far" is quantitatively determined based on the coordinates of the waypoint and the attribute information of the movement history, and the cost is set based on the result.

Figure 10:
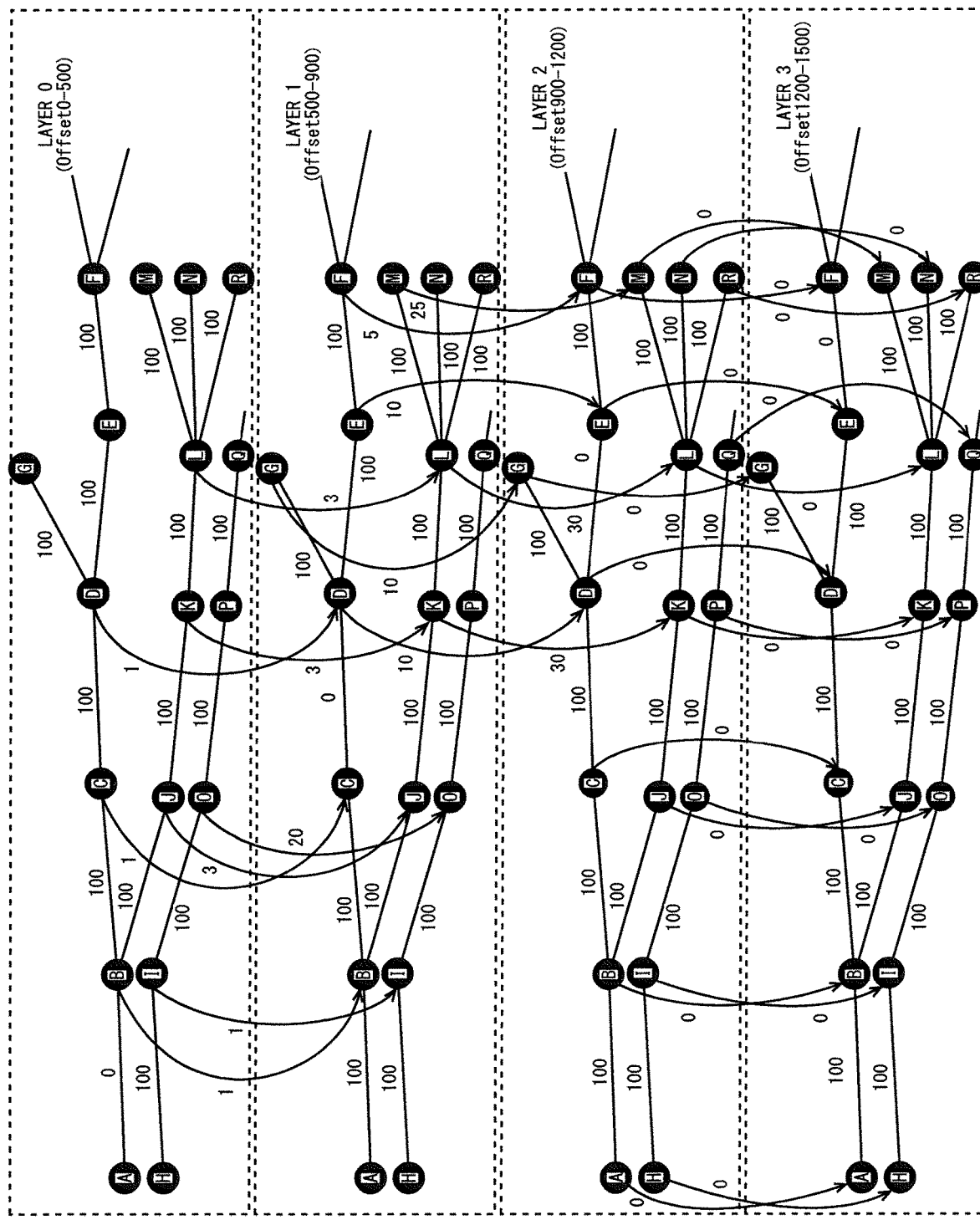
FIG. 10 is a diagram showing an example of cost in the hierarchical logical network according to the first embodiment.

FIG. 10 is a diagram showing an example of the cost in the hierarchical logical network. The cost is set according to the concepts shown in (C), (D) and (E) below.

(C) Regarding the inter-layer cost, the matching unit 4 sets the cost according to the degree of consistency of the link attribute included in the movement information corresponding to each layer with the link attribute of the physical link corresponding to the logical link. When the degree of consistency is large, the cost is reduced, and when the degree of consistency is small, the cost is increased.

For example, focusing on Layer 0 in FIG. 10, the link attribute (link attribute of the link connecting Point 0 and Point 1) included in the movement information corresponding to Layer 0 is "VICS=100". Then, when the link attribute of the physical link AB corresponding to the logical link AB in the hierarchical logical network is "VICS=100", the matching unit 4 sets the cost of the logical link AB to "0". Further, the matching unit 4 sets the cost of the logical link other than the logical link AB to "100". Here, the "logical link AB" indicates that the link connects the logical node A and the logical node B, and the same applies to other logical links.

In the above, although the case where the cost is set according to the degree of consistency of the link attribute has been described, the present invention is not limited thereto. For example, the matching unit 4 may set the cost of the logical link within each layer based on the traveling direction of the moving body at the branch point of each layer and at least one of the presence/absence of a branch of the physical link corresponding to the logical link and the traveling direction after the branch of the physical link corresponding to the logical link. In this case, the traveling direction of the moving body is included in the moving information.

(D) Regarding the cost of the inter-layer link when the boundary between the layers corresponds to the waypoint, the matching unit 4 sets the cost according to the degree of consistency between the coordinates of each waypoint and the coordinates of the physical link corresponding to the logical link. If the distance between the two coordinates is close, it is determined that the degree of coincidence is large and the cost is reduced, and if the distance between the two coordinates is far, it is determined that the degree of coincidence small and the cost is increased. The distance between the two coordinates may be the distance of a perpendicular line drawn from the coordinates of the waypoint to the physical link. If the perpendicular line cannot be drawn from the coordinates of the waypoint to the physical link, the distance of the straight line drawn from the coordinates of the waypoint to the end point closer to the physical link may be adopted.

In the above, although the case where the cost is set according to the degree of coincidence between the coordinates of the waypoint and the coordinates of the physical link has been described, the present invention is not limited thereto. For example, the matching unit 4 may set the cost according to the degree of consistency between the coordinates of the waypoint and the coordinates of the physical node.

(E) Regarding the cost of inter-layer link when the boundary between the layers corresponds to the attribute change points, the matching unit 4 sets all costs to "0".

In Step S25, the matching unit 4 searches for a route in the hierarchical logical network. Specifically, the matching unit 4 applies the Dijkstra's algorithm or the like to search for the route that minimizes the cost in the cost set in Step S24. At this point, the route search is performed focusing on minimizing the cost in the hierarchical logical network without the physical network being taken into consideration.

Figure 11:
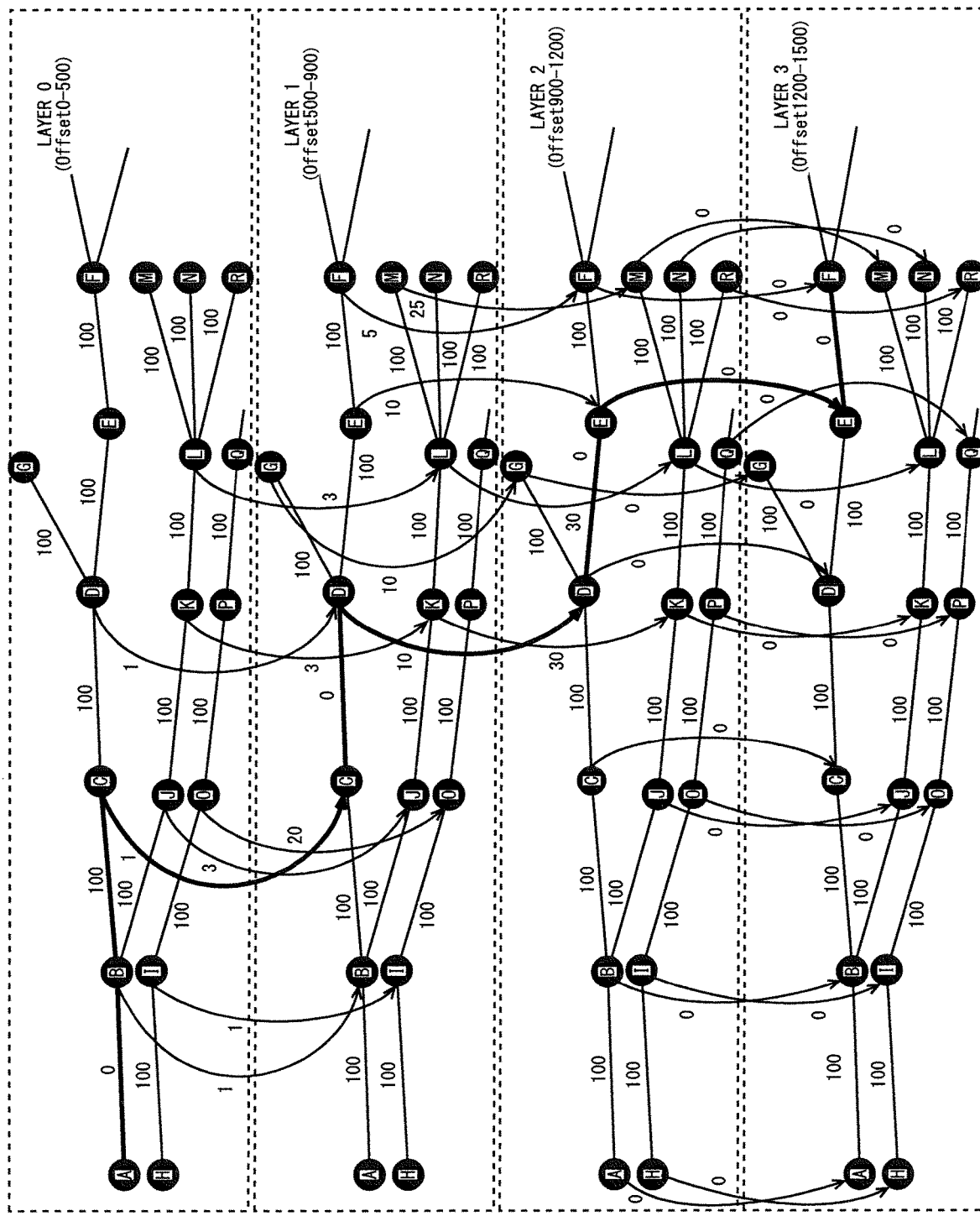
FIG. 11 is a diagram showing an example of a result of route search in the hierarchical logical network according to the first embodiment.
Figure 12:
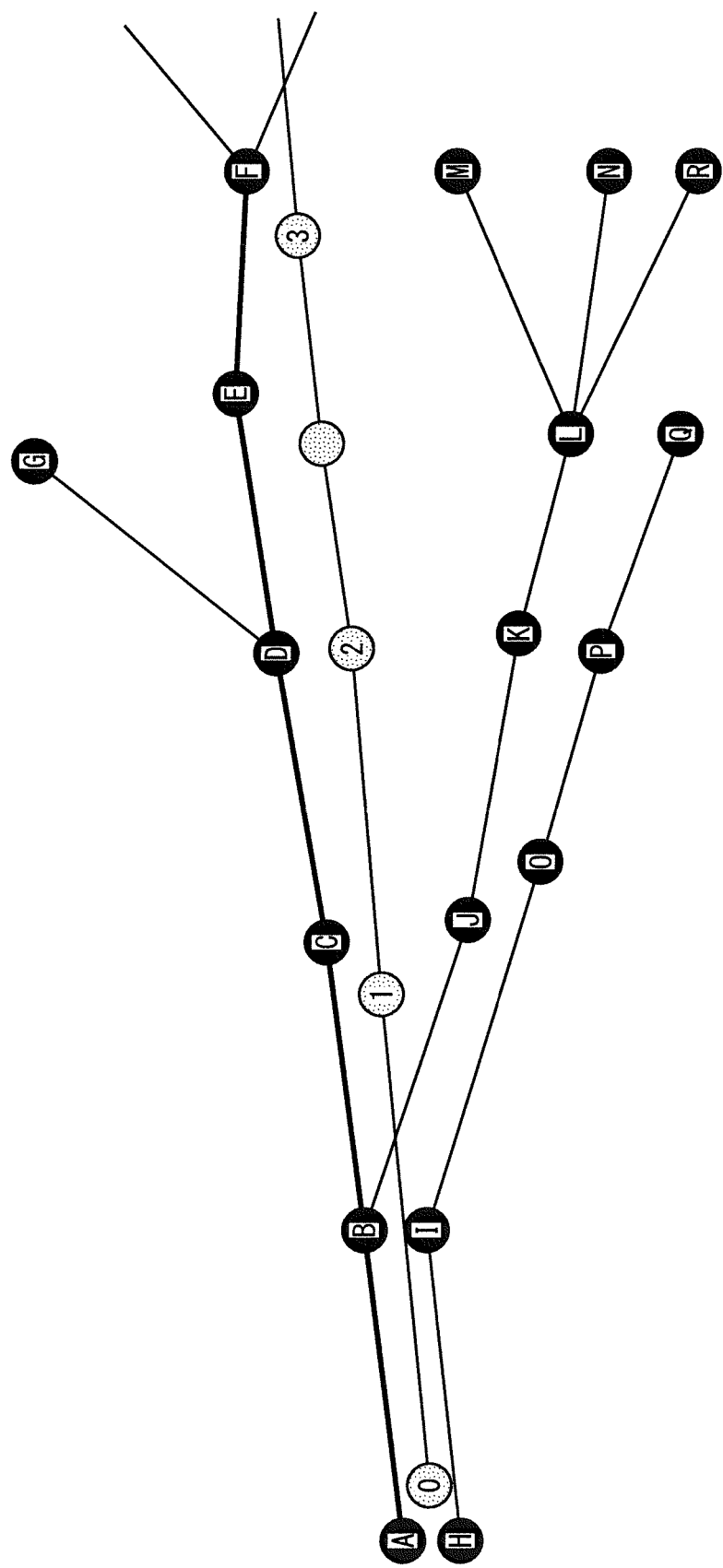
FIG. 12 is a diagram showing an example of a result of route search in the physical network according to the first embodiment.

FIG. 11 is a diagram showing the results of route search in the hierarchical logical network. As shown in FIG. 11, the matching unit 4 searches for the route that minimizes the cost in the hierarchical logical network. FIG. 12 shows the result of reflecting the result of the route search on the physical network. As shown in FIG. 12, the route, which consists of a plurality of links connecting physical node A, physical node B, physical node C, physical node D, physical node E, and physical node F, is the route having the highest degree of coincidence with the route consisting of the coordinate point string included in the movement information (that is, the route searched or estimated by the route search unit 11 of IVI 9).

<Effect>

From the above, according to the first embodiment, the cost-minimized route on the logical network, with which the total cost set based on the above (C) to (E) is minimized, that is, the route which is expected to be closest to the movement information of the moving body is calculated. As a result, the route obtained with a map other than the high-precision map is made accurately matched on the high-precision map.

Specifically, the hierarchical logical network is generated based on a coordinate point string included in a route in which the moving body travels or is predicted to travel in the future and a high-precision map, and a route is obtained on the high-precision map using the hierarchical logical network. This allows the state of the physical node to a given coordinate point string to be applied to the shortest route issue in the form of a "layer".

In the hierarchical logical network, an inter-layer link connecting the same logical nodes between the layers is set, and a cost is set for the inter-layer link. This allows setting the cost according to the positional relationship between the coordinate point string and the physical link.

In the hierarchical logical network, the shortest route search is performed using the cost of inter-layer link, and the route on a high-precision map is obtained. This allows obtaining a route that minimizes the cost of the entire route.

In the route search in the hierarchical logical network, the shortest route search may be performed using the costs of a plurality of parameters. Link attributes other than the link number may be used for the plurality of parameters, and each may be weighted. This allows obtaining a route in which a plurality of parameters are considered.

Second Embodiment

In the first embodiment, the case where the route on which the moving body is to travel in the future is matched on the high-precision map has been described. In the second embodiment, a case where a route the moving body traveled in the past is matched on the map will be described.

Figure 13:
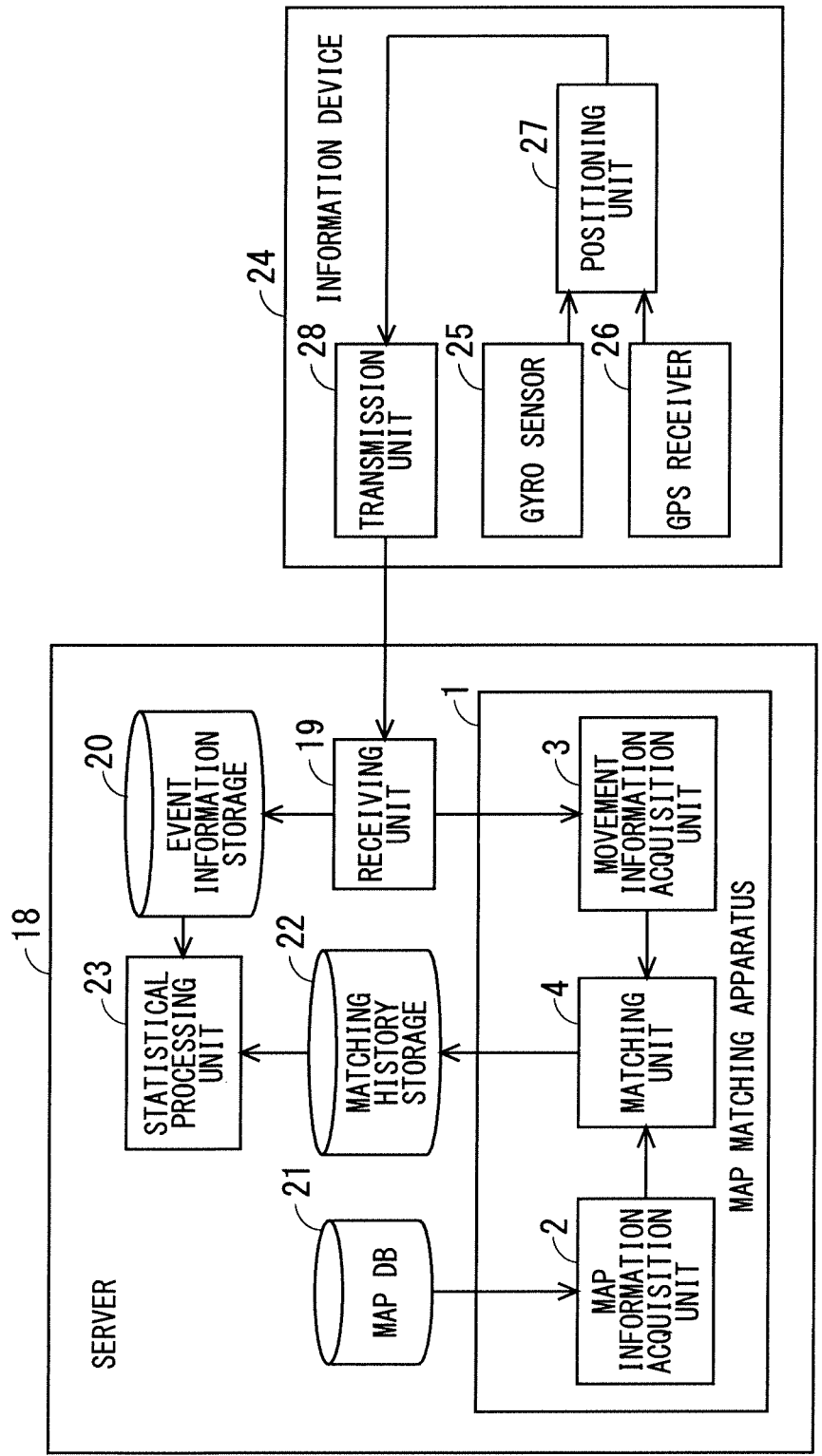
FIG. 13 is a block diagram showing an application example of a map matching apparatus according to a second embodiment.

FIG. 13 is a block diagram showing an application example of a map matching apparatus 1 according to the second embodiment, and shows an example of a system configuration including a server 18 and an information device 24.

The information device 24 is an in-vehicle device that outputs probe data, and includes a gyro sensor 25, a Global Positioning System (GPS) receiver 26, a positioning unit 27, and a transmission unit 28. The information device 24 is provided on the moving body.

The gyro sensor 25 detects the angular velocity of the moving body during traveling. The GPS receiver 26 calculates the position of the moving body based on the signal received from a GPS satellite.

The positioning unit 27 calculates a position of the moving body in a place where the GPS receiver 26 cannot receive a signal, such as in a tunnel, based on the angular velocity detected by the gyro sensor 25 and the position of the moving body calculated by the GPS receiver 26. In places where the GPS receiver 26 can receive the signal, the position calculated by the GPS receiver may be used as it is, and the position of the moving body may be calculated based on the signal the GPS receiver 26 has received and the angular velocity the gyro sensor 25 has detected.

The transmission unit 28 transmits the position information of the moving body the positioning unit 27 has calculated and additional event information to a server 18 as movement information (probe data) via the Internet. Examples of the event information include information around the moving body acquired from a sensor (not shown) provided on the moving body, the state of the driver of the moving body, and the like.

The server 18 is a probe data analysis server that analyzes movement information (probe data) received from the information device 24, and includes the map matching apparatus 1, a receiving unit 19, an event information storage 20, a map DB 21, and a matching history storage 22, and a statistical processing unit 23. Hereinafter, although the case where the map DB 21 stores the above-mentioned regular map will be described, the above-mentioned high-precision map may be stored.

The receiving unit 19 receives the movement information of the moving body from the information device 24 via the Internet. Of the movement information which the receiving unit 19 has received, the event information is recorded in the event information storage 20 and the position information of the moving body is acquired and held by the movement information acquisition unit 3. When a plurality of mobile bodies provided with the information device 24 exist, the receiving unit 19 receives the moving information from each information device 24.

The map matching apparatus 1 includes the map information acquisition unit 2, the movement information acquisition unit 3, and the matching unit 4, similar to the map matching apparatus 1 shown in FIG. 2. The map information acquisition unit 2 and the matching unit 4 have the same configuration and operation as those described in the first embodiment; therefore, detailed description thereof will be omitted here.

The movement information acquisition unit 3 acquires the position information of the moving body among the movement information which the receiving unit 19 has received and holds the position information in chronological order. Further, when the movement information acquisition unit 3 acquires the position information of a plurality of moving bodies, the movement information acquisition unit 3 holds the position information for each moving body in chronological order. In this manner, the movement information acquisition unit 3 acquires the coordinate point string of the position of the moving body in the past traveled route.

The event information storage 20 stores event information in chronological order among the movement information which the receiving unit 19 has received. When the receiving unit 19 receives the movement information of the plurality of moving bodies, the event information storage 20 stores the moving information for each moving body.

The matching history storage 22 stores the link string included in the route on which the moving body has traveled on the map, which is specified by the matching unit 4 of the map matching apparatus 1. When the matching unit 4 specifies a link string for the plurality of moving bodies, the matching history storage 22 stores the link string for each moving body.

The statistical processing unit 23 links the link string stored in the matching history storage 22 and the event information stored in the event information storage 20 based on a common time (time stamp) and accurately identifies on which link on the map the event occurred. That is, the statistical processing unit 23 accurately identifies the position of the moving body on the map when an event occurs.

From the above, according to the second embodiment, the map matching apparatus 1 performs the same operation as that of the first embodiment, so that the route the moving body traveled in the past can be accurately matched on the map.

<Hardware Configuration>

Each function of the map information acquisition unit 2, the movement information acquisition unit 3, and the matching unit 4 in the map matching apparatus 1 described in the first and second embodiments is implemented by the processing circuit. That is, the map matching apparatus 1 includes a processing circuit acquiring the map information, acquiring the movement information of the moving body, and specifying a link string corresponding to a route on a map based on the map information and the movement information. For the processing circuit, dedicated hardware may be adopted, or a processor (also referred to as a Central Processing Unit (CPU), a central processing unit, a processing unit, an arithmetic unit, a microprocessor, a microcomputer, a Digital Signal Processor (DSP)) that executes a program stored in a memory may also be adopted.

When the dedicated hardware is applied to the processing circuit, as shown in FIG. 14, a processing circuit 29 corresponds, for example, to a single circuit, a composite circuit, a programmed processor, a parallel programmed processor, an Application Specific Integrated Circuit (ASIC), or a Field-Programmable Gate Array (FPGA), or the combination thereof. While each function of the map information acquisition unit 2, the movement information acquisition unit 3, and the matching unit 4, or may also be implemented by one processing circuit 29, each function may be collectively implemented by one processing circuit 29.

When the processing circuit 29 is applied to the processor 30 shown in FIG. 15, each function of the map information acquisition unit 2, the movement information acquisition unit 3, and the matching unit 4 is implemented by software, firmware, or a combination of software and firmware. The software or firmware is written as a program and stored in a memory 31. The processor 30 implements each function by reading and executing the program recorded in the memory 31. That is, the map matching apparatus 1 includes the memory 31 for storing the program which, eventually, executes the steps of acquiring the map information, acquiring the movement information of the moving body, and specifying a link string corresponding to a route on the map based on the map information and the movement information. Further, it can be said that these programs are programs to execute the procedure and method of the map information acquisition unit 2, the movement information acquisition unit 3, and the matching unit 4. Here, the memory may be, for example, a non-volatile or volatile semiconductor memory, such as a Random Access Memory (RAM), a Read Only Memory (ROM), a flash memory, an Erasable Programmable Read Only Memory (EPROM), an Electrically Erasable Programmable Read Only Memory (EEPROM), or the like, a magnetic disk, a flexible disk, an optical disk, a compact disk, a digital versatile disc (DVD) or the like, or any storage medium used in the future.

For each function of the map information acquisition unit 2, the movement information acquisition unit 3, and the matching unit 4, part of functions thereof may be implemented by dedicated hardware and another part of the components is implemented by software or the like.

Accordingly, the processing circuit can implement the above each function by hardware, software, firmware, or a combination thereof.

<System Configuration>

Although the map matching apparatus described above is applicable to a high-definition locator as described in the first embodiment, or applicable to a probe data analysis server as described in the second embodiment, the application thereof not limited thereto. The map matching apparatus is applicable, for example, to an in-vehicle navigation device, that is, a satellite navigation device, or a Portable Navigation Device (PND) that is mountable on a vehicle, and these can be appropriately combined to construct a system. In this case, each function or each component of the map matching apparatus is distributed and arranged in each function for constructing the above system.

Further, software in the above embodiments may be incorporated into, for example, a server. A map matching method implemented by the server executing the software includes acquiring map information including link endpoint coordinates, which are coordinates of endpoints of a plurality of links, and a connection relationship of each of the links, acquiring movement information of a moving body on a predetermined route, identifying a link string, which is a string of the links corresponding to the route, based on the acquired map information and the acquired movement information, and specifying the link string includes generating a physical network, which is a road network, based on the connection relationship and the movement information, generating a hierarchical logical network in which the physical network is duplicated a plurality of times and configured into hierarchy specifying a route with a minimized cost in the hierarchical logical network as the link string.

As described above, by incorporating the software that executes the operation in the above embodiments into the server and operating the server, the same effect as that in the above embodiments can be obtained.

In the present disclosure, the embodiments can be combined, appropriately modified or omitted, without departing from the scope of the disclosure.

While the disclosure has been shown and described in detail, the foregoing description is in all aspects illustrative and not restrictive. It is therefore understood that numerous modifications and variations can be devised without departing from the scope of the disclosure.

EXPLANATION OF REFERENCE SIGNS 1 map matching apparatus, 2 map information acquisition unit, 3 moving information acquisition unit, 4 matching unit, 5 high-definition locator, 6 receiving unit, 7 high-precision map, 8 transmission unit, 9 IVI, 10 IVI map DB, 11 route search unit, 12 transmission unit, 13 ECU, 14 receiving unit, 15 recognition unit, 16 determination unit, 17 controller, 18 server, 19 receiving unit, 20 event information storage, 21 map DB, 22 matching history storage, 23 statistical processing unit, 24 information device, 25 gyro sensor, 26 GPS receiver, 27 positioning unit, 28 transmission unit, 29 processing circuit, 30 processor, 31 memory.

The invention claimed is:

1. A map matching apparatus of an autonomous driving vehicle comprising:
 a processor to execute a program; and
 a memory to store the program which, when executed by the processor, performs processes of, acquiring map information including link endpoint coordinates, which are coordinates of endpoints of a plurality of links, and a connection relationship of each of the links;

acquiring movement information of a moving body on a predetermined route; and specifying a link string, which is a string of the links corresponding to the route, based on the map information and the movement information; and providing the specified link string to a controller, which controls an autonomous driving operation of a vehicle on the basis of the specified link string, wherein the process of specifying a link string includes generating a physical network, which is a road network, based on the connection relationship and the movement information, generating a hierarchical logical network in which the physical network is duplicated in a plurality of layers and configured into a hierarchy based on an offset relative to a common point of the route, the physical network being duplicated by copying the same road network data into each of the plurality of layers, and specifying the link string indicating a minimized cost in the hierarchical logical network.

2. The map matching apparatus according to claim 1, wherein when a part of a section of the route is not included in the movement information, the link string corresponding to the part of the section is not specified.

3. The map matching apparatus according to claim 1, wherein the route is a route on which the moving body is to travel in the future.

4. The map matching apparatus according to claim 1, wherein the route is a route on which the moving body traveled in the past.

5. A map matching apparatus of an autonomous driving vehicle comprising a processor to execute a program; and a memory to store the program which, when executed by the processor, performs processes of, acquiring map information including link endpoint coordinates, which are coordinates of endpoints of a plurality of links, and a connection relationship of each of the links;

acquiring movement information of a moving body on a predetermined route;

specifying a link string, which is a string of the links corresponding to the route, based on the map information and the movement information; and providing the specified link string to a controller, which controls an autonomous driving operation of a vehicle on the basis of the specified link string, wherein the process of specifying a link string includes generating a physical network, which is a road network, based on the connection relationship and the movement information, generating a hierarchical logical network in which the physical network is duplicated in a plurality of layers and configured into a hierarchy based on an offset relative to a common point of the route, the physical network being duplicated by copying the same road network data into each of the plurality of layers, and specifying the link string indicating a minimized cost in the hierarchical logical network, the movement information includes a coordinate point string of positions on the route, a number of layers in the hierarchical logical network is equal to or greater than a number of divided sections obtained by dividing the route by the coordinate point string, a start link in the hierarchical logical network is a logical link within a layer corresponding to a first coordinate point of the coordinate point string and closest to the first coordinate point, and an end link in the hierarchical logical network is the logical link within a layer corresponding to a last coordinate point of the coordinate point string and closest to the last coordinate point.

6. The map matching apparatus according to claim 5, wherein the process of specifying a link string includes determining that the logical link existing within a predetermined radius centered on the first coordinate point is the start link and determine that the logical link existing within a predetermined radius centered on the last coordinate point is the end link.

7. The map matching apparatus according to claim 6, wherein the start link and the end link include, in addition to the logical link existing within the predetermined radius, the logical links connected before and after thereof distanced by a predetermined distance from the logical link based on the connection relationship.

8. The map matching apparatus according to claim 5, wherein each layer in the hierarchical logical network corresponds to each of the divided sections, and the process of specifying a link string includes determining a cost for moving between each of the layers in the hierarchical logical network based on a distance between coordinates corresponding to each of the layers of the coordinate point string and the link endpoint coordinates in the physical network.

9. The map matching apparatus according to claim 5, wherein the movement information includes a traveling direction of the moving body at a branch point of a road, each layer in the hierarchical logical network corresponds to each of the divided sections, and the process of specifying a link string includes determining a cost of a logical link within each layer in the hierarchical logical network based on a traveling direction of the moving body at the branch point of each of the layers and at least one of presence/absence of a branch of the physical link in the physical network and the traveling direction after the branch of the physical link in the physical network.

10. The map matching apparatus according to claim 5, wherein the movement information includes a road attribute on the route, each layer in the hierarchical logical network corresponds to a divided section divided the route by the road attribute, and the process of specifying a link string includes determining a cost of a logical link within each layer in the hierarchical logical network based on the road attribute based on the movement information corresponding to each of the layers, and the road attribute included in the map information in the physical network.

11. The map matching apparatus according to claim 10, wherein
the road attribute includes at least one of a road type, a link type, the number of lanes, a road width, a speed limit, presence/absence of toll, a link number, a road name, a national road number, and a prefectural road number.

12. A map matching method comprising the steps of a processor:
- acquiring map information including link endpoint coordinates, which are coordinates of endpoints of a plurality of links, and a connection relationship of each of the links;
- acquiring movement information of a moving body on a predetermined route; and
- specifying a link string, which is a string of the links corresponding to the route, based on the acquired map information and the acquired movement information; and
- providing the specified link string to a controller, which controls an autonomous driving operation of a vehicle on the basis of the specified link string, wherein
specifying a link string includes
- generating a physical network, which is a road network, based on the connection relationship and the map information,
- generating a hierarchical logical network in which the physical network is duplicated a plurality of times and configured into a hierarchy based on an offset relative to a common point of the route, the physical network being duplicated by copying the same road network data into each of the plurality of layers, the physical network being duplicated by copying the same road network data into each of the plurality of layers, and
- specifying a route with a minimized cost in the hierarchical logical network as the link string.

* * * * *